E. R. OSGOOD.
Handle for Cross-Cut Saw.
No. 221,418.          Patented Nov. 11, 1879.
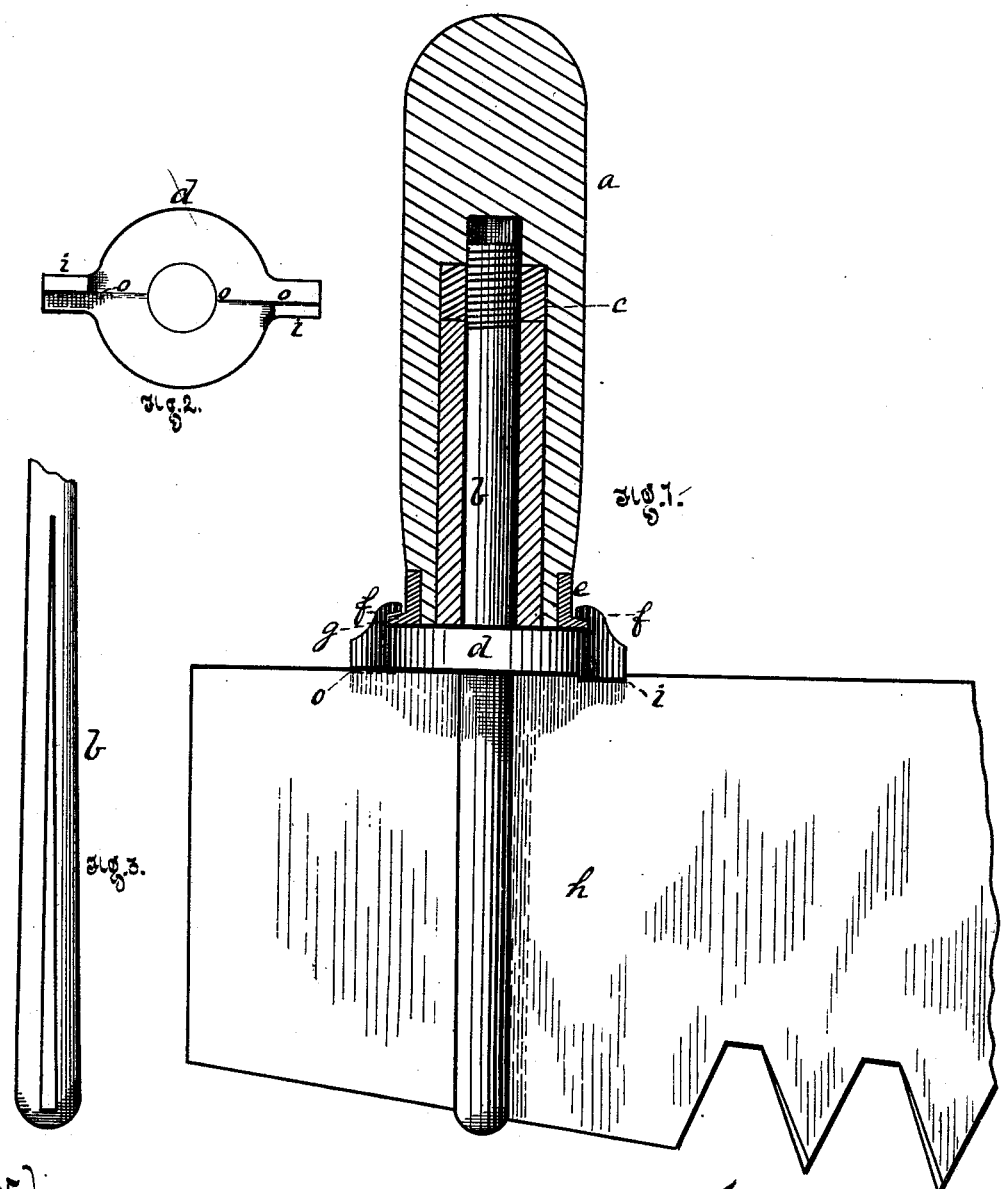

UNITED STATES PATENT OFFICE

ELIJAH R. OSGOOD, OF COLUMBUS, OHIO, ASSIGNOR TO HUBBARD, BAKEWELL & CO., OF PITTSBURG, PENNSYLVANIA.

IMPROVEMENT IN HANDLES FOR CROSSCUT-SAWS.

Specification forming part of Letters Patent No. 221,418, dated November 11, 1879; application filed August 1, 1879.

*To all whom it may concern:*

Be it known that I, ELIJAH R. OSGOOD, of Columbus, in the county of Franklin and State of Ohio, have invented a new and useful Improvement in Handles for Crosscut-Saws; and I do hereby declare the following to be a full, clear, and exact description thereof, reference being had to the accompanying drawings, forming part of this specification, in which—

Figure 1 is a side elevation, partly in section. Fig. 2 is a face view of the washer. Fig. 3 is an edge view of the slotted bolt.

Like letters refer to like parts wherever they occur.

My invention relates to that class of handles for crosscut-saws wherein the saw is drawn firmly against a movable washer on the adjacent end of the handle by means of a slotted bolt operating in a nut secured to or in said handle; and it is an improvement upon the handle shown and described in Letters Patent No. 212,396, granted to me on February 18, 1879. In that patent the lower face of the loose washer is scored or grooved to fit upon the edge of the saw, so as to form a seat, into which the saw is drawn tightly when the bolt is screwed up; but such device required the sawyer to hold and adjust the washer to position, so that the saw would be seated in the groove when screwed up in order to obtain a firm and reliable attachment of the handle. This involved not only the use of both hands, one of which is frequently required to be free, but was troublesome and inconvenient.

My present invention consists in providing the washer with a clutch construction, which, when the handle is turned in tightening up, will cause the washer to assume its proper position and seat the saw automatically.

In the drawings, $a$ indicates the handle; $b$, the slotted bolt; $c$, the nut in which it turns, and $d$ the washer, which is loosely secured to the ferrule $e$ by bent lugs $f$, turned over the annular bead $g$, and turns freely around the bolt $b$. The saw is marked $h$.

Instead of grooving the face of the washer $d$ to form the seat for the edge of the saw, I form on each end, but on opposite sides of that portion where the saw comes, a projection or lug, $i$, the height of which is about equal to the height of one screw-thread of the bolt; and I prefer to score or groove the face of the washer slightly along the inner bases of the lugs, as at $o$.

With this construction the washer does not have to be held or adjusted to the saw; but when the handle is turned to draw up the saw, the lugs, encountering the saw, act as a clutch and hold the washer in proper position while the saw is being drawn to its seat. If desired, the lug or projection may be made on one side only.

This device is simple and effective. It insures the certain and automatic securing of the saw in its seat, and hence always a proper fastening of the handle to the saw. It does not increase the cost, and experience has proved it to be a useful and salable device.

What I claim as my invention, and desire to secure by Letters Patent, is—

In a handle for crosscut and similar saws, wherein a slotted bolt and adjustable handle are employed, the combination, with the handle, of a washer, movable thereon and therewith, said washer having upon its under face one or more guide-lugs, which engage with the saw and cause the proper positioning of the washer thereon when the handle is being applied, substantially as specified.

In testimony whereof I, the said ELIJAH R. OSGOOD, of Columbus, Franklin county, Ohio, have hereunto set my hand.

ELIJAH R. OSGOOD.

Witnesses:
T. V. N. MYERS,
DAVID K. WATSON.